(12) United States Patent
Towle et al.

(10) Patent No.: US 10,800,876 B2
(45) Date of Patent: Oct. 13, 2020

(54) AMINE AND NON-AMINE DERIVATIZED POLYARYLETHERKETONE RANDOM AND BLOCK COPOLYMERS

(71) Applicant: KETONEX LIMITED, Oxfordshire (GB)

(72) Inventors: Ian David Henderson Towle, Oxfordshire (GB); Kaylie Jane Smith, Oxfordshire (GB); Pauline Julia Siddons, Oxfordshire (GB)

(73) Assignee: Ketonex Limited, Oxford (GB)

( * ) Notice: Subject to any disclaimer, the term of this patent is extended or adjusted under 35 U.S.C. 154(b) by 0 days.

(21) Appl. No.: 15/312,594

(22) PCT Filed: May 21, 2015

(86) PCT No.: PCT/GB2015/051488
§ 371 (c)(1),
(2) Date: Nov. 18, 2016

(87) PCT Pub. No.: WO2015/177550
PCT Pub. Date: Nov. 26, 2015

(65) Prior Publication Data
US 2017/0081467 A1   Mar. 23, 2017

(30) Foreign Application Priority Data

May 22, 2014   (GB) .................................. 1409128.4

(51) Int. Cl.
*C08G 65/40* (2006.01)
*C08G 61/12* (2006.01)

(52) U.S. Cl.
CPC ....... *C08G 61/127* (2013.01); *C08G 65/4012* (2013.01); *C08G 2261/12* (2013.01); *C08G 2261/126* (2013.01); *C08G 2261/1644* (2013.01); *C08G 2261/3442* (2013.01); *C08G 2261/45* (2013.01)

(58) Field of Classification Search
CPC ....................... C08G 65/4012; C08G 2261/126
See application file for complete search history.

(56) References Cited

U.S. PATENT DOCUMENTS

| | | | |
|---|---|---|---|
| 3,065,205 A | 11/1962 | Bonner | |
| 3,288,855 A | 11/1966 | Schisla | |
| 3,953,400 A | 4/1976 | Dahl | |
| 4,698,393 A | 10/1987 | Jansons et al. | |
| 4,751,274 A * | 6/1988 | Ittemann | C08L 71/00 525/471 |
| 4,777,282 A * | 10/1988 | Towle | C07C 327/00 558/234 |
| 4,786,694 A * | 11/1988 | Clendinning | C08G 65/4012 525/471 |
| 4,808,693 A * | 2/1989 | Dahl | C08G 61/127 528/125 |
| 4,816,556 A | 3/1989 | Gay et al. | |
| 4,820,792 A * | 4/1989 | Towle | C08G 61/127 528/126 |
| 4,837,284 A * | 6/1989 | Matzner | C08G 61/127 525/437 |
| 4,841,011 A * | 6/1989 | Towle | C07C 45/46 525/242 |
| 4,841,013 A | 6/1989 | Towle | |
| 4,843,131 A | 6/1989 | Becker et al. | |
| 4,861,915 A * | 8/1989 | Clendinning | C08G 65/4012 568/328 |
| 4,898,983 A | 2/1990 | Towle | |
| 4,912,181 A | 3/1990 | Becker et al. | |
| 4,959,424 A * | 9/1990 | Matzner | C07C 45/46 525/471 |
| 4,960,555 A * | 10/1990 | Satake | C08G 75/024 264/288.4 |
| 4,990,589 A * | 2/1991 | Towle | C08G 61/127 528/125 |
| 5,084,530 A | 1/1992 | Matzner et al. | |
| 5,116,933 A * | 5/1992 | Newton | C08G 65/4012 528/125 |
| 5,145,938 A * | 9/1992 | Towle | C08G 61/127 528/125 |
| 5,221,728 A * | 6/1993 | Bennett | C08G 61/12 528/125 |

(Continued)

FOREIGN PATENT DOCUMENTS

CN   102 875 819 A   1/2013
EP       174 207 A2   3/1986

(Continued)

OTHER PUBLICATIONS

International Search Report issued by European Patent Office dated Jul. 31, 2015 in the corresponding PCT Application No. PCT/GB2015/051488—4 pages.
Written Opinion dated 2015 in the corresponding PCT Application No. PCT/GB2015/051488—7 pages.
Search Report issued by Intellectual Property Office in UK dated Nov. 25, 2014—1 page.
D. Nengwen, et al., "Novel Soluble Aromatic Poly(ether amide sulfone amide ether ketone ketone)s by electrophilic solution polycondensation," High Performance Polymers, Institute of Physics Publishing, vol. 23, No. 2, Mar. 2011, pp. 132-140.
B. Huang, et al., "Synthesis and properties of novel random copolymers of (polyether ketone esther ketone ketone)-poly(ether ketone imide)," J. Polym Research, vol. 20, No. 81, 2013, pp. 1-8.

(Continued)

*Primary Examiner* — Liam J Heincer
(74) *Attorney, Agent, or Firm* — Knobbe, Martens, Olson & Bear, LLP

(57) ABSTRACT

The present invention provides a method of preparing a polyaryletherketone copolymer (e.g. a random or block copolymer), said method comprising: polymerizing (i) a monomer system suitable for forming aryletherketone units and (ii) a comonomer in a reaction medium comprising: (a) a Lewis acid and (b) a controlling agent comprising an aromatic carboxylic acid, an aromatic sulphonic acid, or a derivative thereof; and polymers produced therefrom.

15 Claims, No Drawings

(56) References Cited

U.S. PATENT DOCUMENTS

| | | | | |
|---|---|---|---|---|
| 5,260,404 | A | | 11/1993 | Whiteley et al. |
| 5,338,821 | A | * | 8/1994 | Towle .................. C07D 307/91 |
| | | | | 528/125 |
| 5,734,005 | A | | 3/1998 | Daniels et al. |
| 5,969,082 | A | * | 10/1999 | Kuwahara .......... B01D 67/0088 |
| | | | | 523/122 |
| 6,316,660 | B1 | * | 11/2001 | Sato ...................... C07C 227/16 |
| | | | | 560/125 |
| 6,437,080 | B1 | * | 8/2002 | McGrail ............ C08G 65/4093 |
| | | | | 528/171 |
| 9,023,468 | B2 | * | 5/2015 | Towle ...................... A61L 27/18 |
| | | | | 428/402 |
| 9,683,079 | B2 | * | 6/2017 | Pratte ...................... C08G 65/48 |
| 9,765,185 | B2 | * | 9/2017 | Louis .................. C08G 65/4012 |
| 9,783,636 | B2 | * | 10/2017 | Chaplin ............. C08G 65/4012 |
| 2007/0031371 | A1 | * | 2/2007 | McManus .............. A61K 31/74 |
| | | | | 424/78.37 |
| 2009/0082538 | A1 | * | 3/2009 | Wu ...................... C08G 65/4012 |
| | | | | 528/128 |
| 2010/0234539 | A1 | * | 9/2010 | Malet ................. A63B 37/0093 |
| | | | | 525/436 |
| 2011/0178237 | A1 | * | 7/2011 | Ono .................... C08G 65/4012 |
| | | | | 524/592 |
| 2012/0263953 | A1 | | 10/2012 | Podobinski et al. |
| 2014/0235787 | A1 | * | 8/2014 | Capra ................ C08G 65/4012 |
| | | | | 524/592 |
| 2015/0322210 | A1 | * | 11/2015 | Sriram .................... B01D 69/02 |
| | | | | 521/180 |
| 2015/0337082 | A1 | * | 11/2015 | Pratte ...................... C08G 65/48 |
| | | | | 525/436 |
| 2016/0152769 | A1 | * | 6/2016 | Wilson ................... C08G 65/40 |
| | | | | 524/592 |
| 2017/0107323 | A1 | * | 4/2017 | Towle .................. C08G 61/127 |
| 2017/0253696 | A1 | * | 9/2017 | Towle .................. C08G 61/127 |

FOREIGN PATENT DOCUMENTS

| | | | |
|---|---|---|---|
| EP | 0 254 585 A2 | 1/1988 | |
| EP | 0 262 919 A2 | 4/1988 | |
| GB | 2287031 A | 9/1995 | |
| WO | WO 86/02368 A1 | 4/1986 | |
| WO | WO 89/04848 A1 | 6/1989 | |
| WO | WO 90/00573 A1 | 1/1990 | |
| WO | WO-9000573 A1 * | 1/1990 | ........... C08G 61/127 |
| WO | WO-9207894 A1 * | 5/1992 | ........... C08G 61/12 |
| WO | WO 02/00270 A1 | 1/2002 | |
| WO | WO 2011/004164 A2 | 1/2011 | |
| WO | WO 2014/095794 A2 | 6/2014 | |

OTHER PUBLICATIONS

P.J. Horner, et al., "Aromatic Ether-Ketone-'X' Polymers," J. Mater. Chem. vol. 1(2), 1991, pp. 271-280.
Amendment to Search Report in received in British Patent Application No. GB1415972.7 dated Sep. 2, 2015.
Chemical Abstract 1930:44191.
Chemical Abstract 1930:44192.
Chemical Abstract 1963:441387.
Chemical Abstract 1963:441388.
Chemical Abstract 2003:61487.
Choi, J., et al., Effect of Endgroup Modification on Dynamic Viscoelastic Relaxation and Motion of Hyperbranched Poly(ether keton)s, Journal of Polymer Science, Part B, Polymer Physics 46(19):2079-2089, 2008.
Colquhoun, H..M., et al., Polyetherketones Based on Para-Carborane: Synthesis, Sulfonation, and Membrane-Forming Characteristics, Polymer 38(17):4539-4546, Aug. 1, 1997.
Colquhoun, H.M., et al., Polyetherketones From Diarylcarboranes: A New Approach to Semi-Inorganic Polymers, Polymer 38(10):2447-2453, May 1, 1997.
Corfield, G.G., et al., Synthesis and Calorimetric Curing Study of Amino-Terminated Peek Oligomers, Journal of Polymer Science 30(5):845-849, Apr. 1, 1992.
Database WPI, Week 201343, Thomson Scientific, London, GB, Jan. 16, 2013, XP002742495.
Noiset., O., et al., Surface Modification of Poly(aryl ether ether ketone) (PEEK) Film by Covalent Coupling of Amines and Amino Acides Through a Spacer Arm, Journal of Polymer Science 35(17):3779-3790, Dec. 1, 1997.
Özarslan, O., et al., Novel poly(arylene ether ketone ketone)s Synthesized by Friedel-Crafts Acylation, Macromol., Chem. Phys 199:1887-1893, 1998.
Search Report received in British Patent Application No. GB1409126.8 dated Nov. 24, 2014.
Search Report received in British Patent Application No. GB1415972.7 dated Mar. 11, 2015.
Search Report received in connection with International Patent Application No. PCT/GB2010/001318 dated Mar. 29, 2011.
Search Report received in connection with International Patent Application No. PCT/GB2015/052614 dated Nov. 11, 2015.
Search Report received in International Patent Application No. PCT/GB2015/051487 dated Jul. 28, 2015.
Written Opinion received in connection with International Patent Application No. PCT/GB2015/052614 dated Nov. 11, 2015.
Written Opinion received in International Patent Application No. PCT/GB2015/051487 dated Jul. 28, 2015.
Zolotukhin, M.G., et al., Superacid-Catalyzed Polycondensation of Acenaphthenequinone with Aromatic Hydrocarbons, Macromolecules 38:6005-6014, 2005.

* cited by examiner

AMINE AND NON-AMINE DERIVATIZED POLYARYLETHERKETONE RANDOM AND BLOCK COPOLYMERS

FIELD OF THE INVENTION

The present disclosure concerns copolymers of polyaryletherketones (PAEKs or PEKs). In particular, it concerns methods for making the PAEK copolymers, particles of the copolymers and methods for adding additional functionality.

BACKGROUND OF THE INVENTION

Common terminology involves naming polyaryletherketones by reference to the structure of the repeating unit (as is standard in polymer chemistry) with families being named according to the sequence of ether (symbolised by "E") and ketone (symbolised by "K") linkages in the repeat units. For example, polymers consisting essentially of the repeating unit: —Ar—O—Ar—C(=O)—Ar—C(=O)— would be referred to as "PEKK". Copolymers comprising such a repeat unit, together with sulphone-containing unit would be referred to as a PEKK-sulphone copolymer.

Polyaryletherketones have a variety of useful properties, such as excellent electrical insulating and mechanical properties at high temperature, high strength, toughness and resistance to heat and chemicals. Such polymers may be amorphous or semi-crystalline. Both types usually exhibit high glass transition temperatures ($T_g$), while the semi-crystalline forms also exhibit high melting temperatures ($T_m$). Amongst these polymers, the PEK, PEKK, PEEK, PEEKK and PEKEKK families are of particular interest for use in preparing biomedical implants and implant materials due to their excellent mechanical properties, chemical inertness and resistance to stress cracking. The same materials are also useful in aerospace and many other wide-ranging industrial applications including the preparation of thermoplastic composites.

As noted above, PAEKs have wide-ranging uses due to their excellent mechanical properties, chemical inertness and resistance to stress cracking. However, some applications of the polymers (e.g. those related to the aerospace industry) would benefit from utility at higher temperatures. There thus exists a need for materials which can be used at high temperatures while still retaining their crystallinity at the temperature of use.

Increasing the processing temperature of these types of materials whilst retaining crystallinity requires $T_g$ to be increased. However, a problem exists because polymer modifications intended to increase $T_g$ also increase $T_m$ to a point where processing the material becomes too difficult.

The present inventors have surprisingly found this problem can be solved by producing PEK copolymers, particularly block copolymers, which have these desired properties. For example, it has been found that, in a PEK-imide copolymer the PEK parts crystallise (retaining a lower overall $T_m$) and the imide parts remain amorphous (giving a high overall $T_g$). This effect is particularly pronounced for block copolymers, where longer PEK parts will crystallise at their "normal" temperature (retaining a lower overall $T_m$) and the non-PEK parts remain amorphous (giving a high overall $T_g$).

Random copolymers of ether ketones having different chemical groups incorporated into the monomers (e.g. imides and amides) are reported in Horner et al., *J. Mater. Chem.* (1991) 1(2):271-280 which uses an electrophilic process to prepare random copolymers. Similar copolymers and processes are also taught in U.S. Pat. No. 5,436,310.

These prior art copolymers are produced in the form of a gel which is difficult to process as it requires specialist polymerisation equipment. High temperature nucleophilic routes for making random copolymers are also known. Unfortunately none of the prior art polymers have the desired $T_g/T_m$ values.

There thus exists a need for improved methods for preparing polyetherketone copolymers, in particular methods which do not require special equipment and handling techniques, yet which can produce a product which on work-up is largely free from reaction impurities.

SUMMARY OF THE INVENTION

Surprisingly, it has been found that the use of certain controlling agents, such as benzoic acid and its derivatives, in PAEK production gives the desired suspension and facilitates the removal of the solvent and the controlling agent in work-up of the final product. This allows a stable reaction product to be achieved in a controlled and reliable manner, thus enabling production on a commercial scale. Moreover, the processes of the present disclosure allow the production of novel materials with high $T_g$ values, which also have $T_m$ values that facilitate processing.

Thus, viewed from a first aspect, the present disclosure provides a method of preparing a polyaryletherketone copolymer (e.g. a random or block copolymer), said method comprising:
polymerising (i) a monomer system suitable for forming aryletherketone units and (ii) a comonomer in a reaction medium comprising:
 (a) a Lewis acid and
 (b) a controlling agent comprising an aromatic carboxylic acid, an aromatic sulphonic acid, or a derivative thereof;
wherein said comonomer is not a compound with the following structure:

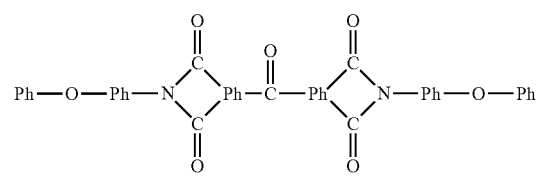

DETAILED DESCRIPTION OF THE INVENTION

The different types of monomer may be polymerised together (i.e. simultaneously in the same vessel) or apart (i.e. in different vessels and/or subsequent to one another). The former approach is especially suitable for the formation of random copolymers, the latter for block copolymers.

By "polyaryletherketone copolymer" is meant a polymer which comprises one or more types of aryletherketone unit and one or more types of non-aryletherketone unit. Aryletherketone units are considered to be parts of the polymer which consist essentially of aryl groups linked by ether and ketone groups. The non-aryletherketone units are one or more units which comprise moieties other than aryl groups, ether groups and ketone groups (although aryl, ether and/or ketone groups may also be present).

In one aspect of the present disclosure, the monomer system suitable for forming aryletherketone units, i.e. (i), may be replaced by one or more monomers which consists essentially of aryl and ketone groups or consists essentially of aryl and ether groups, preferably one consisting of aryl and ketone groups, especially a "KK" unit such as a phthaloyl halide as herein described. In such an aspect the comonomer which comprises non-aryletherketone units should contain ether linkages such that the eventual copolymer contains both ether and ketone linkages.

The copolymers may be random or block copolymers depending on their arrangement of aryletherketone units and non-aryletherketone (i.e. those formed by the comonomer) units. Block copolymers of the present disclosure are considered to be those comprising blocks of at least 2, preferably 2 to 20, especially 3 to 10, e.g. at least 4 aryletherketone units and/or at least 2, preferably 2 to 20, especially 3 to 10, e.g. at least 4 non-aryletherketone units.

As noted above, in all aspects of the present disclosure described herein, block copolymers are particularly preferred due to their effects on the $T_g$ and $T_m$ values. It is typically believed that the crystalline state of the polymer does not affect the $T_g$ and so a single $T_g$ is typically quoted, irrespective of the crystalline state of a polymer. However, for some of the block copolymers of the present disclosure the difference in the amorphous and crystalline $T_g$ can be 20 to 30° C., which is unexpected. Certain polyaryletherketone block copolymers are hitherto unknown and thus form a further aspect of the present disclosure.

Thus, viewed from a further aspect, the present disclosure provides a method of preparing a polyaryletherketone block copolymer, said method comprising:
  polymerising (i) a monomer system suitable for forming aryletherketone units and (ii) a comonomer in a reaction medium comprising:
    (a) a Lewis acid and
    (b) a controlling agent comprising an aromatic carboxylic acid, an aromatic sulphonic acid, or a derivative thereof;
wherein said monomer system suitable for forming aryletherketone units is polymerised separately to (e.g. at a different time to or in a separate vessel from) the comonomer.

The random copolymers of the prior art are made by mixing all the materials together almost simultaneously. The fact that the processes of the present disclosure can be carried out at relatively low temperatures renders the present disclosure particularly useful for the production of block copolymers as the different (e.g. two or more) types of monomer can be added sequentially by opening the reactor once the first component has reacted. The high temperatures (e.g. 350° C.) required for nucleophilic processes render this opening of the reactor problematic (e.g. for safety reasons), the low temperature processes of the present disclosure solve this problem. Alternatively, the different types of monomer may be polymerised in separate reaction vessels before being combined to form a block copolymer.

The monomer system suitable for forming aryletherketone units is polymerised before, after, or at the same time as, the comonomer (i.e. the unit or units which form the non-aryletherketone units of the copolymers of the present disclosure). Moreover, the monomer system suitable for forming aryletherketone units may be polymerised in the same vessel or a different vessel to polymerisation of the comonomer For the formation of random copolymers, all types of monomer may be added and/or polymerised together, i.e. they are polymerised simultaneously in the same vessel. For the formation of block copolymers, the types of monomer are polymerised separately, e.g. at different times and/or in different vessels. For example, at least one type of monomer is added after at least one other has polymerised, e.g. the monomer system suitable for forming aryletherketone units is polymerised before or after the comonomer (or vice versa). Alternatively, in an embodiment especially suited to the formation of block copolymers, the monomers (i.e. (i) and (ii)) are polymerised in different vessels and then mixed together to form the copolymers of the present disclosure.

Thus, in a preferred aspect, the monomer system suitable for forming aryletherketone units is polymerised before the comonomer is added to the reaction medium, or the comonomer is polymerised before the monomer system suitable for forming aryletherketone units is added to the reaction medium. In a further aspect, the monomers are polymerised in different vessels prior to mixing to form the copolymers of the present disclosure.

The non-aryletherketone units of the copolymers are incorporated into the copolymer via one or more types of comonomer which comprise at least one moiety which is not an aryl, ether or ketone moiety. Preferably, these comonomers will contain ether groups to activate the para carbon to electrophilic attack. Examples of such comonomers, in all aspects of the present disclosure described herein are those comprising ester, imide, sulphone and/or amide groups.

In some aspects of the present disclosure, imide groups are less preferred, thus, viewed from a further aspect, the present disclosure provides a method of preparing a polyaryletherketone copolymer (e.g. a random or block copolymer), said method comprising:
  polymerising (i) a monomer system suitable for forming aryletherketone units and (ii) a comonomer comprising an ester, sulphone and/or amide group in a reaction medium comprising:
    (a) a Lewis acid and
    (b) a controlling agent comprising an aromatic carboxylic acid, an aromatic sulphonic acid, or a derivative thereof.

The aryletherketone units of the copolymers of the present disclosure in all aspects of the present disclosure described herein, include, but are not limited to the following (and combinations thereof):
  Ether ketone units, i.e. EK, a unit consisting essentially of: —Ar—O—Ar—C(=O)—.
  Ether ketone ketone units, i.e. EKK, a unit consisting essentially of: —Ar—O—Ar—C(=O)—Ar—C(=O)— (these are particularly preferred).
  Ether ether ketone units, i.e. EEK, a unit consisting essentially of: —Ar—O—Ar—O—Ar—C(=O)—.
  Ether ether ketone ketone units, i.e. EEKK, a unit consisting essentially of: —Ar—O—Ar—O—Ar—C(=O)—Ar—C(=O)—.
  Ether ketone ether ketone ketone, i.e. EKEKK, a unit consisting essentially of: —Ar—O—Ar—C(=O)—Ar—O—Ar—C(=O)—Ar—C(=O)—.

In some aspects of the present disclosure copolymers comprising EKEKK units are less preferred, thus, viewed from a further aspect, the present disclosure provides a method of preparing a polyaryletherketone copolymer (e.g. a random or block copolymer), said method comprising:
  polymerising (i) a monomer system suitable for forming aryletherketone units and (ii) a comonomer in a reaction medium comprising:
    (a) a Lewis acid and
    (b) a controlling agent comprising an aromatic carboxylic acid, an aromatic sulphonic acid, or a derivative thereof;

wherein said aryletherketone unit does not comprise -Ph-O-Ph-C(=O)-Ph-O-Ph-C(=O)-Ph-C(=O)—.

The aryletherketone component of the copolymers of the present disclosure comprises one or more types of aryletherketone unit, e.g. one or more of EK, EKK, EEK, EEKK and EKEKK.

Similarly, the non-aryletherketone units of the copolymers of the present disclosure may comprise one or more types of non-aryletherketone units, e.g. one or more units selected from those comprising ester, imide, sulphone and/or amide groups.

The mixing of types of aryletherketone unit and non-aryletherketone unit can take place within one unit (e.g. -EK-EKK-imide), and/or throughout the copolymer (e.g. -EK-imide-EKK-imide). Preferably, however, only one or two, especially one type of aryletherketone unit and or one or two, especially one type of non-aryletherketone unit is present in the copolymer. Within a single type of unit, e.g. "EK" or "imide", the units themselves need not be totally identical, although they preferably are. For example, in a copolymer with repeat unit -EK-imide-EKK-imide-, the two imide-containing units need not be identical and nor do the aromatic groups of the EK and EKK units. Similarly, the aromatic moieties within a single aryletherketone unit need not be identical, e.g. "EK" encompasses the likes of -Ph-O-naphthyl-C(=O)— and -Ph-O-Ph-C(=O)—. In a most preferred aspect, the aryletherketone units are identical throughout the polymer, as are the non-aryletherketone units.

The method of the present disclosure allows for copolymers including any combination of the monomers herein described to be produced, e.g. a copolymer comprising several types of monomer such as an ether-ketone-imide-ester-amide-sulphone-copolymer could be made if desired. Particularly preferred copolymers are those comprising the following combinations of comonomers (in combination with one or more aryletherketone units as herein described):
amide and imide
ester and imide
sulphone and imide
sulphone and amide
sulphone and ester References to copolymers comprising a particular combination of units (e.g. an aryletherketone unit and a comonomer) as herein described should be understood to encompass polymers containing one or more of said combination of units, as well as polymers consisting of, or consisting essentially of, said combination of units.

As noted above, the present disclosure enables to production of copolymers with a variety of useful properties. Yet further functionality can be added by incorporating amine groups into the polymers. The present inventors have surprisingly found that amine-functionalised (e.g. amine-terminated) PEK copolymers can be produced using a process in which the reactive amine end-cap is protected during the reaction and subsequently de-protected during the final work-up. The invention thus conveniently enables the addition of amine groups when performing the polymerisation reaction, i.e., no additional steps are required on order to achieve amine functionalisation. The use of protecting groups is common in pharmaceutical organic chemistry, but is generally avoided in polymer chemistry and other industrial applications due to the additional cost and complexity it can add to a process.

Amine-functionalisation thus forms a preferred aspect of all embodiments of the present disclosure as herein described.

Viewed from a further aspect, the present disclosure provides a method of preparing an amine functionalised (e.g. amine terminated) polyaryletherketone copolymer (e.g. a random or block copolymer), said method comprising the steps of:
polymerising (i) a monomer system suitable for forming aryletherketone units and (ii) a comonomer in a reaction medium comprising:
(a) a Lewis acid and
(b) a controlling agent comprising an aromatic carboxylic acid, an aromatic sulphonic acid, or a derivative thereof;
and
adding a capping agent comprising —$NR_2$, —NRH or a protected amine group to said reaction medium.

"R" is either an aliphatic or aromatic group and is defined below.

As this conveniently enables the addition of amine groups when performing the polymerisation reaction, the method is preferably a single-step reaction, i.e., no additional steps before or after polymerisation are required in order to achieve amine functionalisation.

The term "functionalised" is intended to encompass polymers with one or more amine functional groups as end-groups. It also encompasses polymers in which the amine groups are substituents on the polymer chain, i.e. pendant to the backbone. Preferably, the polymers are functionalised at the end groups.

The polymers of the present disclosure may be "functionalised" insofar as they comprise one or more amine groups as end groups, i.e. at one or more ends of the polymer chain and/or as pendant groups, i.e. at one or more positions along the polymer backbone. With regard to particulate polymers of the present disclosure, the term "functionalised" is therefore intended to encompass amine groups on the particles, at least some of which have the potential to bond with other materials, e.g. other monomers in formulations.

The functional groups for the polymers of the present disclosure are amines, i.e. —$NR_2$, NRH or —$NH_2$, preferably NRH or —$NH_2$, especially —$NH_2$, and derivatives thereof, where "R" is either an aliphatic or aromatic group. Where R is an aromatic group, it is preferably Ar as herein described (especially phenyl). Where R of —$NR_2$ or NRH is an aliphatic group, it is preferably selected from alkyl groups, e.g. C1-6 aliphatic groups, especially methyl or ethyl groups. The compounds described herein in which the functional group is protected, i.e. those functionalised by protected amine groups as described herein, form a further aspect of the present disclosure.

Multiple amine functionalisation is also encompassed, e.g. where a phenyl ring at the end of the polymer has more than one, i.e. 1 to 5 amine groups thereon.

Preferably, the polymers of the present disclosure are terminated with an amine group, i.e. an amine group is found on at least one end of the polymer chain. Typically at least 50% of the end groups, i.e. the ends of the polymer chains are amine-functionalised, preferably at least 70%, especially preferably at least 85%, e.g. at least 95%. Preferably, substantially all chain ends comprise an amine group. Amine-terminated polymers are particularly preferred.

In a further aspect, as an alternative to, or in addition, to amine-termination of the chain, the amine groups may be pendant to the polymer chain, i.e. they are substituents of the polymer's aromatic moieties. Typically, 0 to 100% of the Ar groups, preferably 25 to 75%, i.e. around 50% of the Ar groups are substituted with an amine group.

The amine groups of the present disclosure may be situated on aryl groups which themselves are attached to ketone and/or ether linkages of the polymer. In a less preferred aspect, there may be a linker group between the aryl group of the polymer chain and the amine group.

If desired, the polymers of the present disclosure may be blended with one another or with other types of polymer to form polymer blends.

Each aromatic moiety in the polymer repeating unit (Ar) may be independently selected from substituted and unsubstituted mononuclear aromatic moieties (e.g. phenylene) and substituted and unsubstituted polynuclear aromatic moieties. The term "polynuclear" is considered to encompass fused aromatic rings such as naphthalene and non-fused rings such as biphenyl, etc. Particularly preferably, Ar is phenylene (Ph) e.g. unsubstituted phenylene.

The phenylene and polynuclear aromatic moieties (i.e. "Ar") may contain substituents on the aromatic rings. Such substituents would be readily understood by the skilled person and should not inhibit or otherwise interfere with the polymerisation reaction to any significant extent. Typical substituents may include, for example, phenyl, halogen (e.g. F, Cl, Br, I), ester, nitro, cyano and the like.

In cases where Ar is substituted, the substituents are preferably pendant to the chains, rather than in the backbone, i.e. not bonded to a carbonyl carbon atom of a ketone linkage nor to an oxygen atom of an ether linkage. Thus, in a particularly preferred aspect, the ketone linkages (i.e. the carbon atoms of the carbonyl group) are directly attached to carbon atoms, especially to carbon atoms of adjacent aromatic (i.e. to aromatic carbons). Similarly, the oxygen atoms of the ether linkages are preferably attached to carbon atoms, especially to aromatic carbon atoms of adjacent aromatic groups.

Linear copolymers are preferred, however cross-linked polymers are also encompassed. Cross-linked polymers may be produced by using cross-linking agents and/or suitable monomers containing more than two (i.e. 3, 4, 5 or 6) ether or carboxylic acid halide (e.g. chloride) groups in the methods of the present disclosure. Examples of such monomers and agents include benzene-1,3,5-tricarbonyl chloride; 1,3,5-triphenoxy benzene; benzene-2,3,5,6-tetracarbonyl chloride; benzene-1,2,3,4,5,6-hexacarbonyl chloride; 1,2,3, 4,5,6-hexaphenoxy benzene; naphthalene-1,4,5,8-tetracarbonyl chloride, triphenoxybenzene, benzenetricarboxylic acid chloride, hexaphenyl benzene and the like. These monomers or agents are typically used in relatively low concentrations, e.g. from 0.5M % to 25M %, or between 0.5M % and 25M %.

Especially preferably the compounds of the present disclosure are linear and terminated with a functional group.

Oligomeric analogues of the copolymers of the present disclosure form a further aspect of the present disclosure. The processes herein described are also applicable to oligomers. Thus, viewed from a further aspect, the present disclosure provides oligomer derivatives of the polyaryletherketone copolymers herein described and processes for their production, e.g. oligomers comprising one or more polyaryletherketone units as herein described and one or more non-polyaryletherketone units as herein described. Where more than one ether-ketone unit is present, the compound may be monofunctional, bifunctional, trifunctional or multifunctional.

Particularly preferred oligomer compounds are those according to the following formulae:

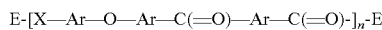

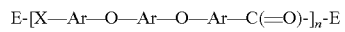

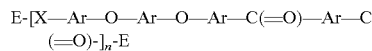

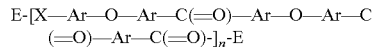

Where, Ar is an aromatic group, n is an integer from 1 to 20, e.g. 1 to 10, especially 1 to 5, particularly preferably 2 to 4, X is a non-polyaryletherketone unit as herein described, e.g. a unit comprising an ester, amide, imide and/or sulphone moiety and E is either an end group or an amine functional group or protected amine as herein described, especially —$NH_2$.

The functionalised compounds of the present disclosure are produced using a process which involves use of a capping agent. The capping agent comprises —$NR_2$, —NRH or a protected version of the amine group which is intended to functionalise the copolymer, monomer or oligomer. Certain protected capping agents are novel and form a further aspect of the present disclosure. Preferably, the capping agent comprises a protected amine group.

Without wishing to be bound by theory, it is thought that, if not protected, then any amine groups (especially those comprising —$NH_2$) involved in the polymerisation reaction would react with the carboxylic acid chloride monomers to give an amide linkage in the polymer chain that is unstable compared to a ketone group. The capping agents of the present disclosure therefore comprise, e.g. include, —$NR_2$, —NRH or protected amine functional groups (preferably protected amine groups), the protecting group functioning to protect the eventual amine groups during polymerisation. The use of a capping agent comprising a —$NR_2$, —NRH or a protected amine, in the production of the polyaryletherketone copolymers and their monomer and oligomer analogues herein described is novel and thus forms a further aspect of the present disclosure. Capping agents comprising leaving groups (e.g. those comprising protected amine groups) are especially preferred. Capping agents comprising hydroxyl groups (—OH) are less preferred.

Especially suitable capping agents of the present disclosure are of general formula $(Z)_a$—Ar—$(X)_b$ wherein:

each X is independently selected from —O—Ar, —C(=O)Cl, —C(=O)—Ar—O—Ar and —O—Ar—[—C(=O)—Ar—O—Ar—]$_c$—H where each Ar is independently as defined herein;

c is an integer, e.g. 1 to 10, preferably 1 to 4,

Z is —$NR_2$, —NRH or a protected amine group, e.g. each Z is independently selected from —$NR_2$, —NRH, —NHL, —NRL or —$NL_2$ (preferably —NHL) and L is a leaving group, such as an acetyl, haloacetyl (e.g. trifluoroacetyl), carbonate (e.g. t-Boc), sulphonyl, halosulphonyl, —$SO_2$—R, e.g. —$SO_2$—$CH_3$, —$SO_2$—$CF_3$ etc. (carbonate groups such as t-Boc are less preferred);

each R group is independently as defined herein, i.e. an aliphatic or aromatic group;

a is 1 to 5, preferably 1, 2 or 3, especially 1 and b is 1 to 5, preferably 1, 2 or 3, especially 1.

In one embodiment, where Z is $NL_2$, the two leaving groups can be linked to form an imide, e.g. Z is of the following structure:

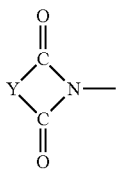

Where Y is a linker group, especially an aryl group (especially phenyl), —(CH$_2$)$_n$— or —(CF$_2$)$_n$—, where n is an integer, preferably 2 to 6. A preferred capping agent of this type is the following, which is available from Molport.

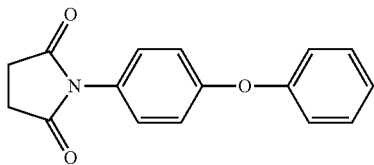

Where R is an aromatic group, it is preferably Ar as herein described (especially phenyl). Where R is an aliphatic group, it is preferably selected from alkyl groups, e.g. C1-6 aliphatic groups, especially methyl or ethyl groups In the case where the capping agent comprises —NR$_2$ or —NRH, each R group is independently as defined herein, i.e. R is independently selected from an aliphatic or aromatic (e.g. Ph) group, preferably aliphatic, e.g. alkyl groups, e.g. C1-6 aliphatic groups, especially methyl or ethyl groups.

Preferably, the capping agent is of formula Z-Ph-O-Ph.

Particularly preferably, Z is a haloacetyl protected amine group, e.g. —NH$_n$R, especially, a trifluoroacetamide group.

Preferred capping agents include the following compound and its acetyl equivalent, i.e. compounds of the above formula where n is 1, Ar is Ph and R is acetyl or trifluoroacetyl:

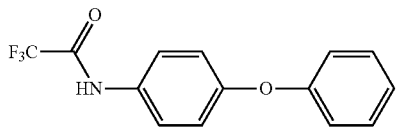 [SMILES: O=C(Nc1ccc(Oc2ccccc2)cc1)C(F)(F)F]

Referred to as CF$_3$-EC or 2,2,2-trifluoro-N-(4-phenoxyphenyl)acetamide

The trifluoroacetyl group has been found to be particularly easy to remove during the acid/base work-up.

Other preferred capping agents include H$_3$C—C(=O)N(H)PhC(=O)Cl, protected 3,5-diaminodiphenylether and derivatives thereof.

The capping agents of the present disclosure can be prepared from readily available materials such as aminobenzoic acid, diaminobenzoic acid and diphenylether.

While the functional groups of the present disclosure are preferably present at the chain end of the compound, functionality pendant to the chain is also an aspect of the present disclosure. In this case, rather than a capping agent (which adds functionality to the end of the chains) a functionalised monomer is used. The amine functional group of the monomer must be protected in order to avoid unstable amide linkages being formed. Suitable monomers are iso- or terephthalic acid chlorides comprising protected amine groups as described above. For example, the amine group of 5-aminoisophthalic acid may be protected prior to conversion of the molecule to the acid chloride. This can then be used in place of some of the terephthaloyl or isophthaloyl chloride monomers when preparing the PAEK copolymers of the present disclosure.

An advantageous feature of the processes of the present disclosure is that the leaving group of the capping agent (i.e. L) is removed during standard work-up procedures following the polymerisation. There is thus no need for a separate "deprotection" step.

Typical work-up conditions which result in removal of the leaving group are the use of water, or acidic/basic aqueous solutions, e.g. solutions of HCl or NaOH. The water or solution is typically at a temperature of 0 to 100° C. at atmospheric pressure, preferably 20 to 100° C., e.g. 50 to 80° C. In some aspects, work-up can take place under pressurised conditions, e.g. at pressures of 200 kPa.

A representative workup procedure for a PEKK polymerisation carried out in a one liter reactor is as follows:

Stand in deionised water overnight;
Filtered and slowly added to 1.5 liters of stirred, hot deionised water to remove the residual dichloromethane
1.5 liters of deionised water and 100 ml concentrated hydrochloric acid are added, boiled for 1 hour, filtered, washed with 500 ml deionised water, filtered;
1.5 liters of deionised water, boiled for 1 hour, filtered, washed with 500 ml deionised water, filtered;
1.5 liters deionised water made to pH 13 with ammonia solution (~30 ml), boiled for 1 hour, filtered, washed with 500 ml deionised water, filtered;
1.5 liters deionised water, boiled for 1 hour, filtered, washed with 500 ml deionised water, filtered;
Off-white PEKK powder isolated.

The monomer system used in the methods herein described comprises monomers suitable for co-polymerisation in order to produce a polyaryletherketone copolymer, e.g. a polymer comprising aryl groups linked via ether linkages, ketone linkages and at least one other type of linkage that is neither an ether nor a ketone. Such monomer systems and combinations would be readily apparent to the person skilled in the art.

Preferred monomers may include but are not restricted to:

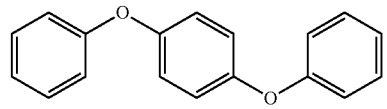 [SMILES: c1ccc(Oc2ccc(Oc3ccccc3)cc2)cc1]

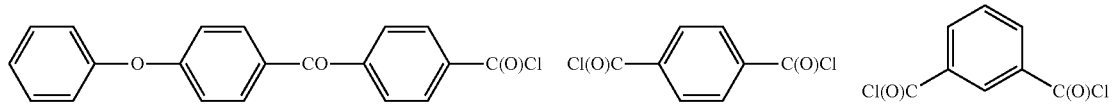

-continued
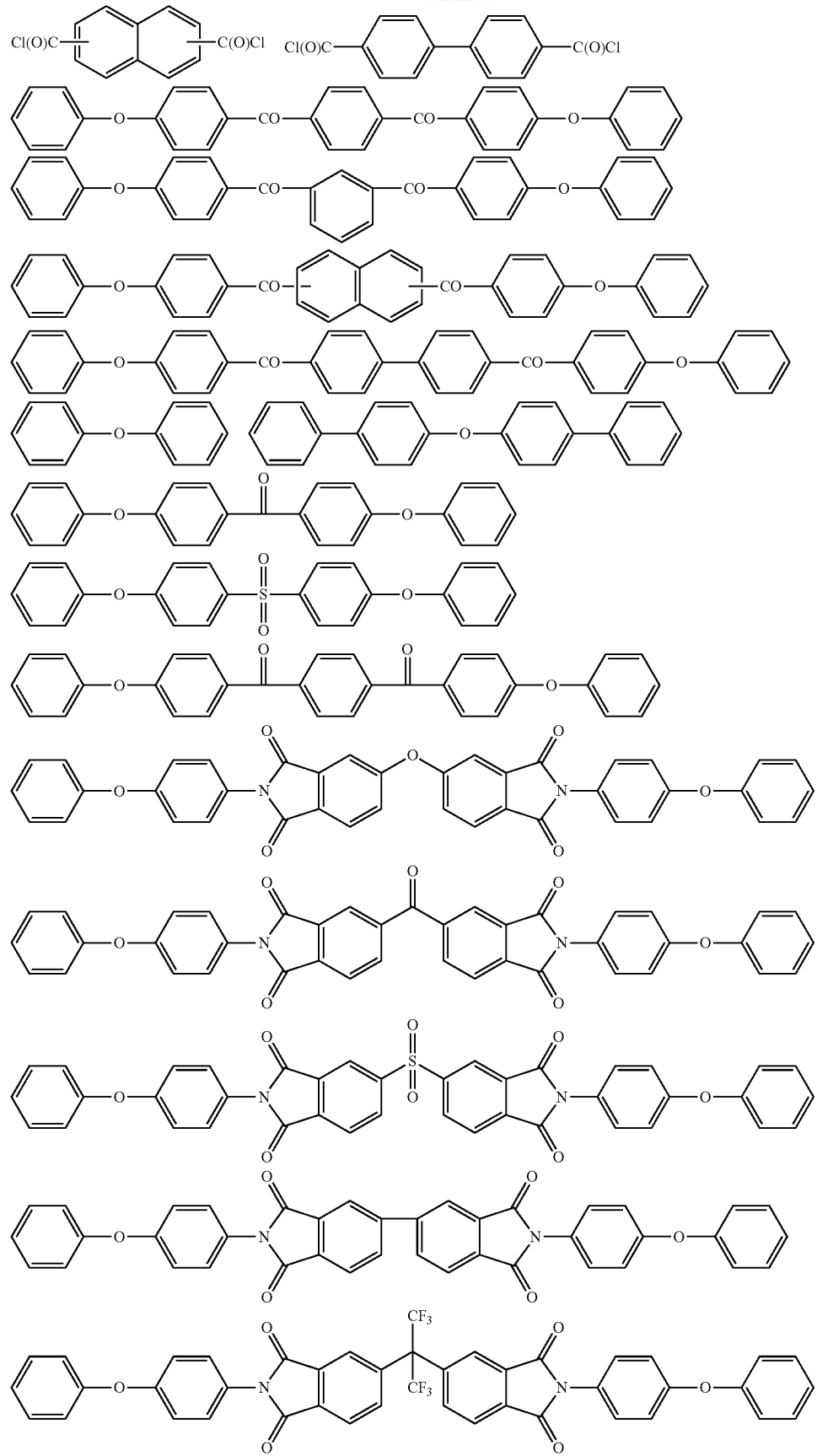

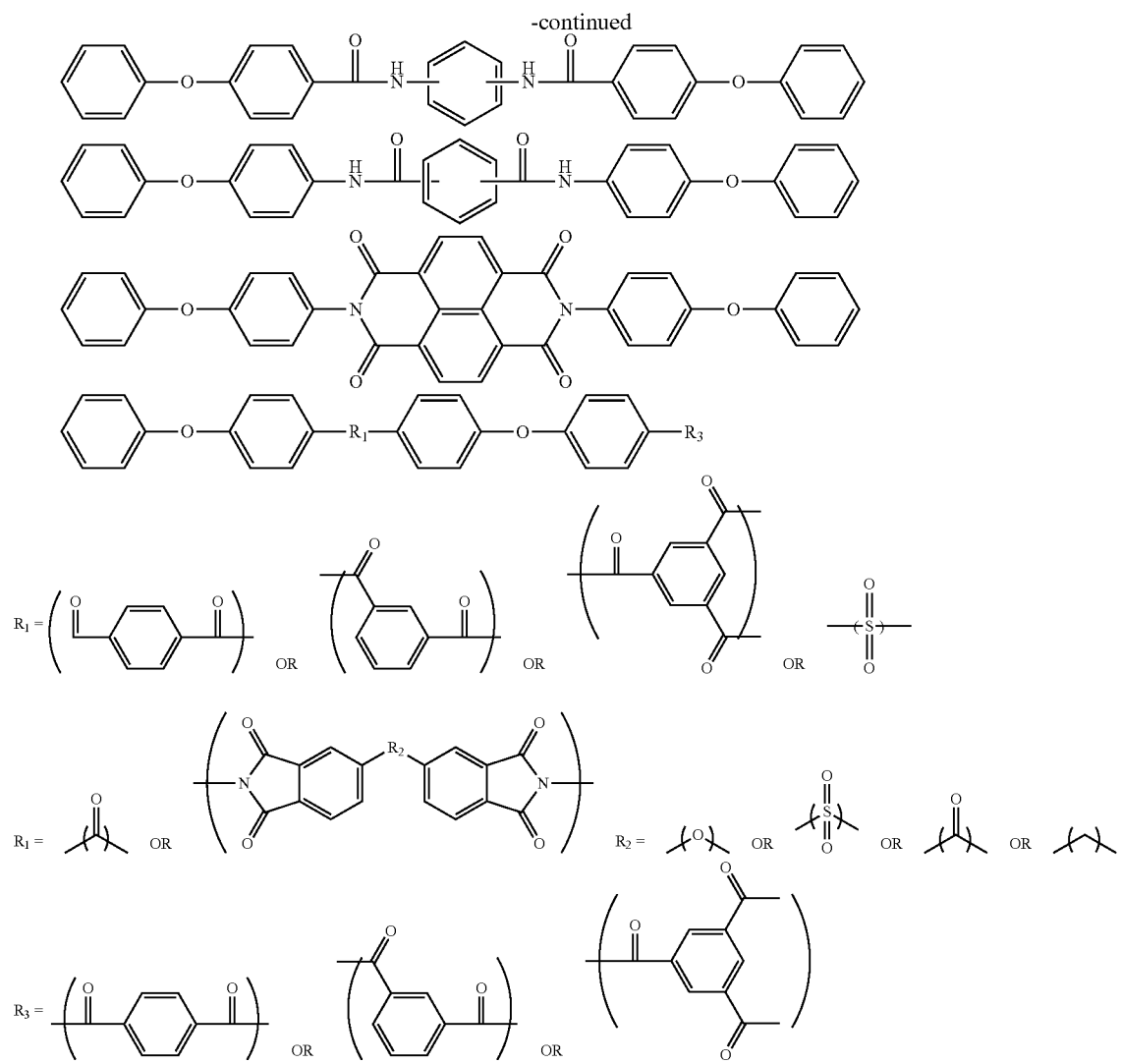

Preferably, at least one of R1 and R3 is the branch unit:

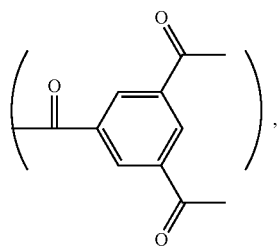

Where branched units are present, they are preferably present in a molar percentage of 0.5% to 25% (i.e. 0.5 to 25M %).

Preferred monomers may include iso and terephthaloyl halides and phthaloyl halides (i.e. the 1,2 substituted version), preferably iso and terephthaloyl halides, preferably chlorides and 1,4-bis(4-phenoxybenzoyl)benzene.

Especially preferred monomers are the following:

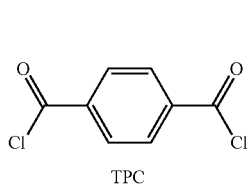

TPC

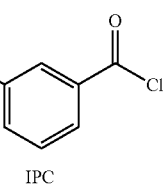

IPC

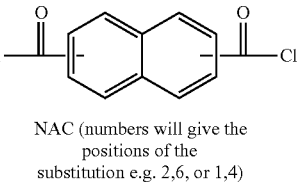

NAC (numbers will give the positions of the substitution e.g. 2,6, or 1,4)

-continued
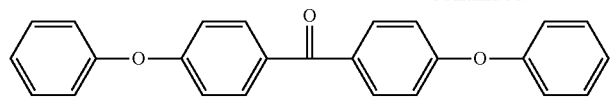
EKE
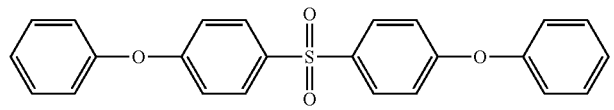
ESE
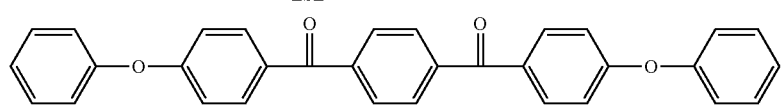
EKKE
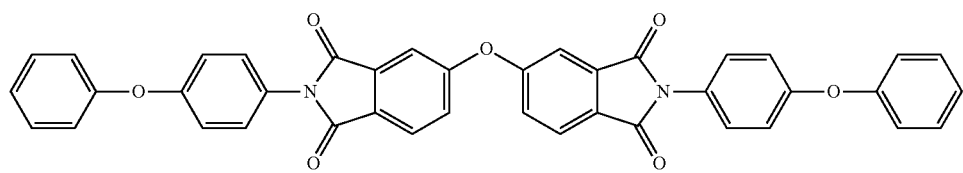
EIEIE
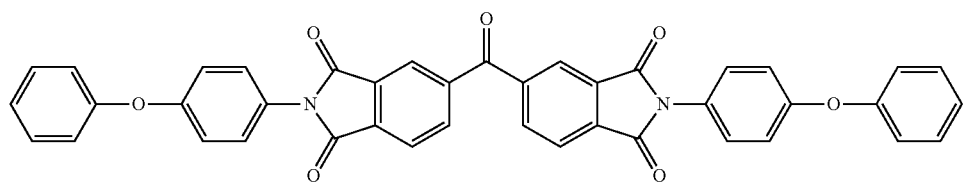
EIKIE
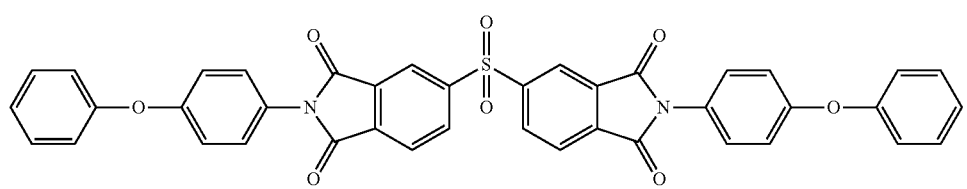
EISIE
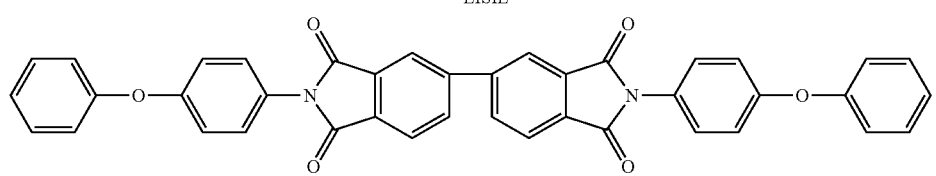
EI-IE
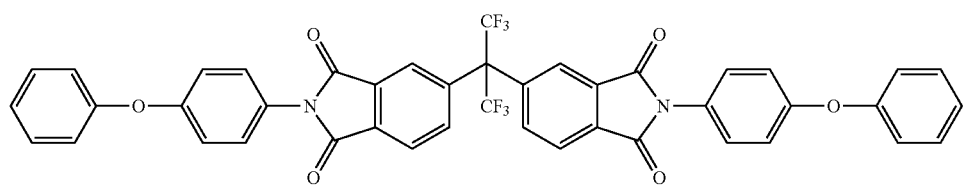
EI6FIE
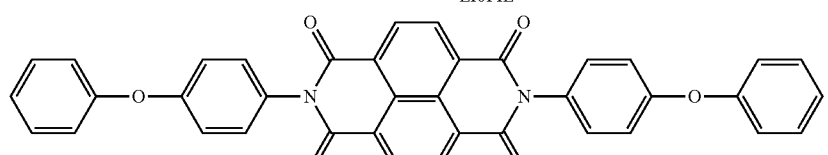
EINIE -continued

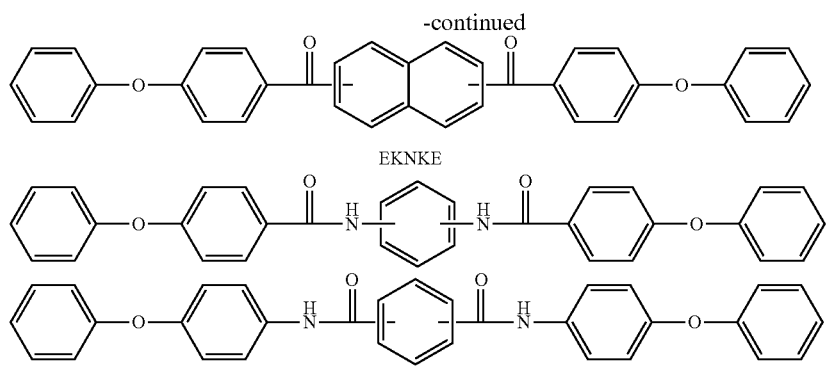

EKNKE

Preferred monomers for the production of the copolymers of the present disclosure include the following (i.e. the copolymer comprises an aryletherketone repeat unit and one or more of the following repeat units):

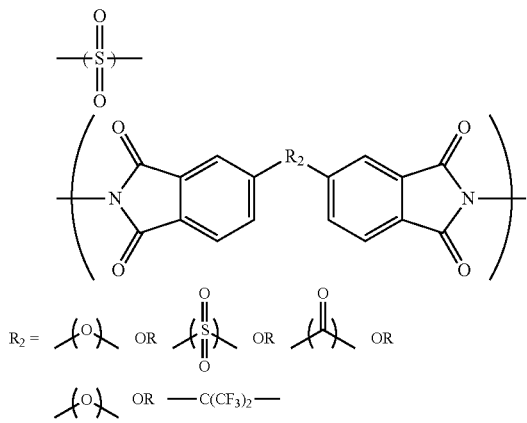

It has been found that the above PEK-Imide copolymers that have electron withdrawing groups between the imide units (—C(═O)— and —SO$_2$—) can result in the products being melt unstable at certain processing temperatures. This can also be the case where the imide unit is in the form -imide-C$_6$H$_2$-imide-. Preferably R$_2$ in the above formula is therefore either electron donating or electron neutral, e.g. a bond, ether, or —C(CF$_3$)$_2$— as these have found to be the most stable.

Five membered rings such as the imide depicted above are strained, which can lead to potential polymer instability during processing. Thus, in all aspects of the invention herein described, it is preferred that the comonomer does not contain a five-membered ring. Especially preferably, the only rings present in the polymer backbone are aryl groups as herein described.

In an especially preferred aspect of processes of the present disclosure, the reaction medium comprises, in addition to the Lewis acid and the controlling agent (and optional capping agent) a compound comprising an aromatic moiety and more than one reactive carbonyl group (e.g. more than one carboxylic acid halide group). In some aspects, this compound can be used as an alternative to the monomer system suitable for forming aryletherketone linkages. Such compounds facilitate reaction between the aryletherketone and non-aryletherketone components of the copolymers and are especially preferred where one or more of the monomers are not self-polymerising. Suitable compounds include multifunctional (especially difunctional or trifunctional) aromatic carboxylic acid halides, especially aromatic di- or tri-carboxylic acid halides, e.g. one or more of the following (where Cl is preferred but may be replaced by any other halide):

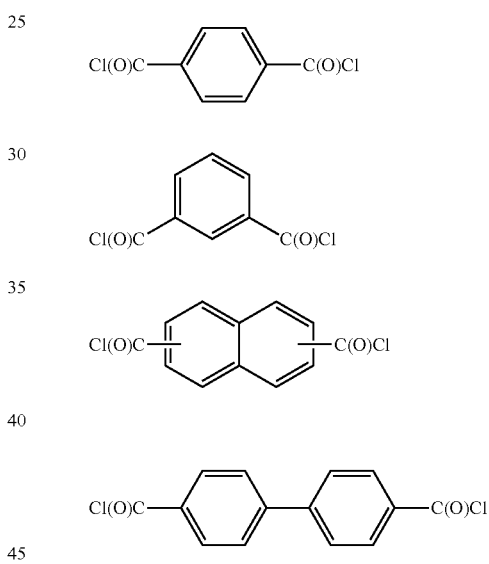

Particularly preferred compounds for this aspect are iso and terephthaloyl halides, preferably chlorides. This aspect of the present disclosure is especially preferred where one or more of the monomers is not self-polymerising as the ketone groups of the monomer participate in the reaction.

Whilst the above-listed chlorides are preferred, other acid halides, particularly the fluorides and the bromides, may also be used. Generally, the chlorides are preferred due to their availability and reactivity. Other groups that are potentially displaceable under Friedel-Crafts conditions may also be used. These might include groups such as —OR, where R is methyl, ethyl, isopropyl or other lower alkyl.

The combinations of monomers suitable for producing the copolymer materials herein described would be readily apparent to a person skilled in the art, as would the relative proportions of the monomers.

Self-condensing monomers such as Ph-O-Ph-C(═O)—Cl (4-phenoxybenzoyl chloride) and Ph-O-Ph-N(C═O)$_2$Ph-C(═O)Cl, i.e.:

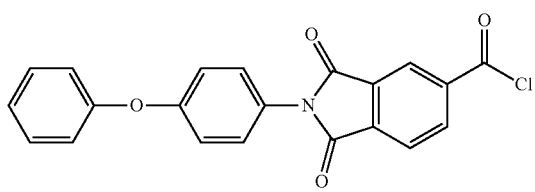 [SMILES: O=C(Cl)c1ccc2c(c1)C(=O)N(c1ccc(Oc3ccccc3)cc1)C2=O]

are also suitable. For example, monomers with repeating units "EKK" can be polymerised alone, to produce PEKK parts of the copolymers of the present disclosure.

The proportion of 1,4-linked aromatic (e.g. phenyl) rings in polyaryletherketones greatly influences the characteristics of the resulting polymer and the size of the particles formed (e.g. its processability, glass transition temperature and its crystalline melting point, even to the extent of producing an amorphous PEKK etc.). Depending on the intended use for the polymer produced, the characteristics can be modified by changing the proportion of 1,4-linked aromatic rings in the polymer. This may be achieved by the use of monomers comprising 1,3-substituted aromatic rings. For example, isophthaloyl halides such as isophthaloyl chloride can be used as monomers and the amounts chosen in relation to the other monomers in order to produce a polymer with the desired characteristics. Preferably the monomers are chosen such that the proportion of 1,3-linked aromatic rings in the resulting polymer is 0 to 100%, more especially 5 to 50%, particularly 20 to 40%, e.g. about 30%. All percentages and ratios are by weight, unless otherwise specified. The proportion of 1,4 (tere-, or "T") to 1,3 (iso-, or "I")-linked aromatic rings in the resulting polymer can also be represented as a tere-:iso-, or "T:I" ratio and is preferably within the range of 100:0 to 60:40.

Particularly preferably the monomer system suitable for forming aryletherketone units comprises bis 1,4-(4-phenoxybenzoyl)benzene and terephthaloyl halide and isophthaloyl halides (e.g. a 60:40 mixture of tere- and iso-phthaloyl chloride) in a 1:1 ratio by weight. This would produce an 80:20 PEKK polymer, i.e. the iso-linked units would be present in 20% by weight in the PEKK part of the copolymer.

The ratio (e.g. molar ratio) of aryketherketone units to non-aryletherketone units in the polymers and oligomers of the present disclosure is in the range of 1:99 to 99:1, e.g. 20:80 to 80:20, especially 30:70 to 70:30, 40:60 to 60:40 or 50:50. The most preferable ratios are 30:70 and 70:30.

The temperature at which the reaction is conducted can be from about −50° C. to about +150° C. It is preferred to start the reaction at lower temperatures, for example at about −50° C. to about −10° C., particularly if the monomer system contains highly reactive monomers. After polymerisation has commenced, the temperature can be raised if desired, for example, to increase the rate of reaction. It is generally preferred to carry out the reaction at temperatures in the range of between about −30° C. and +25° C., particularly +20° C.

The fact that the processes of the present disclosure can be carried out at relatively low temperatures renders the present disclosure are particularly useful for the production of block copolymers as the two (or more) types of monomer can be added sequentially by opening the reactor once the first component has reacted. The high temperatures (e.g. 350° C.) required for nucleophilic processes render this opening of the reactor problematic (e.g. for safety reasons), the low temperature processes of the present disclosure solve this problem. Having calculated the monomer ratios for block length required (e.g. for a PEKK block, the EKKE monomer to KK monomer ratio), the first monomer system is polymerised (in the presence of the Lewis acid and the controlling agent). After that has been given a suitable amount of time to polymerise, which, using the processes of the present disclosure can be carried out at +20° C., the other monomers can be added (following optional cooling to e.g. +5° C.). Addition of further monomers is ideally carried out gradually so as to prevent the reaction temperature rising excessively.

The controlling agent is an aromatic carboxylic acid, aromatic sulphonic acid or derivatives thereof. Such acids may comprise 1, 2 or 3 carboxylic or sulphonic acid groups on an aromatic ring (i.e. these may be mono-, di- or tri-acids). Derivatives of such acids include metals salts and esters.

Preferred controlling agents for use in the method of the present disclosure include the following:
(i) $Ar'(COOX)_y$;
(ii) $Ar'(SO_3X)_y$;
(iii) $(Ar'COO^-)_z M^{z+}$; or
(iv) $(Ar'SO_3^-)_z M^{z+}$
wherein Ar' is an aromatic group compatible with the remaining components of the reaction medium;
each X independently is a hydrogen atom or an organic group (R);
each y independently is 1, 2 or 3;
each M independently is a metal ion and
each z independently is an integer equal to the charge on the metal ion ($M^{z+}$).

The aromatic group of the controlling agent (i.e. Ar') may be selected from substituted and unsubstituted mononuclear (e.g. phenyl) and substituted and unsubstituted polynuclear aromatic moieties. Preferably the aromatic group of the controlling agent is an optionally substituted phenyl group. Preferred substituents may include halogen (e.g. F, Cl, Br, I), nitro, cyano, alkyl (e.g. $C_{1-6}$ alkyl) and the like. Alkyl substituents are preferred, e.g. methyl, ethyl, etc. Where substituents are present, these are preferably electron-withdrawing groups which deactivate the ring to electrophilic attack.

When X=R, the organic group R is preferably a straight-chained or branched $C_{1-6}$ alkyl group, i.e. the controlling agent is an alkyl ester of an aromatic carboxylic acid or aromatic sulphonic acid. More preferably, R is $C_{1-4}$ alkyl. e.g. methyl.

Especially preferred controlling agents for use in the present disclosure include benzoic acid, chlorobenzoic acid (e.g. 4-chloro benzoic acid), methyl benzoic acid (e.g. 4-methyl benzoic acid), sodium benzoate, magnesium benzoate, aluminium benzoate, methyl benzoate and benzene sulphonic acid. Particularly preferably, the controlling agent is benzoic acid.

Mixtures of two or more controlling agents may also be used, if desired.http://en.wikipedia.orgtoilki/File:Friedel-Crafts-acylation-step-3.png The amount of controlling/dispersing agent present is preferably from 0.1 to 6 equivalents per equivalent of acid halide groups present in the monomer system. Typical ranges of ratio of moles of controlling agent to moles of acid halide groups present in the monomer system are from 0.1 to 10, preferably 0.5 to 7, especially 0.7 to 5, particularly preferably 1.5 to 2. Amounts greater than 5 equivalents could be employed, if desired, e.g. up to 10 equivalents, e.g. 7 equivalents. However, no additional controlling or dispersing effect is usually achieved by adding larger amounts and it generally means that more Lewis acid is also required. Thus, it is preferred to use no more than 5 equivalents, more preferably between 0.5 and 4 equivalents and especially 1 to 3 or between 0.5 and 2 or 2 to 4 (e.g. 2 to 3) equivalents per equivalent of acid halide groups. A particularly preferred amount of controlling agent is 2 equivalents per equivalent of acid halide groups.

The actual amount of controlling agent added depends upon, inter alia, the particular controlling agent used, the nature of the monomers present and the type and amount of Lewis acid employed. The ranges given particularly apply to the controlling agents containing one acid or base acid functionality, e.g., those listed as (i) to (iv) above where y or z is equal to 1. For those controlling agents containing more than one acid or base group per molecule, e.g. where y or z is not 1, the equivalents of controlling agent to acid halide groups in the monomer systems may be adjusted accordingly.

Many of the prior art polymerisation processes which employ controlling agents are unreliable to the extent that it cannot be predicted whether a complexed gel or dispersion will result. Mixed solvent systems have been used in order to promote dispersion over gel formation. Whilst such systems may be used in the methods herein described, this is not essential to achieve the desired effects. The present process therefore allows the use of a single solvent (e.g. dichloromethane) which makes solvent removal easier; the dispersion of droplets is easier to control, e.g. benzoic acid can give dispersions of the polymer PEKK in pure dichloromethane without the need for further diluents such as cyclohexane. The fact that solvent mixtures are not required makes solvent removal easier (e.g. dichloromethane can be distilled off at 41° C. with extremely high recovery rates). Use of a single solvent in the processes of the present disclosure is therefore preferred.

Moreover, controlling agents such as benzoic acid can also be readily recovered for future use when carrying out the methods of the present disclosure. The recovery of the controlling agent benzoic acid is facilitated by the fact that the acid has very low solubility in cold water but high solubility in hot water. Thus after heating the polymer slurry in water after decomplexation, the polymer can be recovered by filtration and on allowing the filtrate to cool the benzoic acid crystallises out facilitating its recovery for future use. An alternative method to recover the benzoic acid would be to add sufficient sodium hydroxide to form sodium benzoate which is water soluble (1 g in 2 mL of water), filter and isolate the polymer and then add an acid such as hydrochloric acid to the filtrate to reform benzoic acid which would precipitate from the filtrate.

A further advantage of the present disclosure is the reduction in the amount of water necessary to remove the catalyst residues and controlling agents when compared to that necessary using the gel and tube process. In the complexed gel and tube process the polymer after decomplexation has a very low bulk density, sometimes as low as 0.08 g/mL, thus requiring the use of large work-up vessels and large quantities of water to afford a mobile slurry. Using the dispersion method of the present disclosure (i.e. that involving an aromatic carboxylic acid or aromatic sulphonic acid or derivatives thereof as controlling agent) the bulk density of the isolated polymer is much higher thus permitting the use of much lower volume work-up vessels and significantly reducing the amount of water required to purify the isolated polymer.

The ability to recover the solvent and the controlling agent and the reduction in the amount of water required in the process provides a more sustainable and cost-effective process than the prior art methods which require solvent mixtures, controlling agents which are difficult to remove and large quantities of water.

If necessary, capping agents which do not contain an amine group (protected or otherwise) may be added to the polymerisation reaction medium to cap the polymer on at least one end of the polymer chain. This terminates continued growth of that chain and controls the resulting molecular weight of the polymer. Use of these capping agents may therefore be used to produce polymers within a selected narrow molecular weight range. In this aspect, both nucleophilic and electrophilic capping agents may be used to cap the polymer at each end of the chain. Such capping agents may be used in addition to, or as an alternative to, the capping agent which comprises —$NR_2$, —NRH or a protected amine, which is used to produce the functionalised compounds of the present disclosure. Preferred nucleophilic capping agents of this type are 4-chlorobiphenyl, 4-phenoxybenzophenone, 4-(4-phenoxyphenoxy)benzophenone, biphenyl 4-benzenesulphonylphenyl phenyl ether, and the like. Typical electrophilic capping agents include benzoyl chloride, benzenesulfonyl chloride and the like.

Polymerising agents such as terephthaloyl chloride (TPC) and isophthaloyl chloride (IPC) may also be used. This is optional if a self-polymerising monomer is used.

A Lewis acid is used as catalyst. The term "Lewis acid" is used to refer to a substance which can accept a shared electron pair from another molecule. Suitable catalysts for use in the method of the present disclosure include aluminium trichloride, aluminium tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. Preferably the catalyst is substantially anhydrous aluminium trichloride.

The amount of Lewis acid catalyst used will vary depending on the particular monomers and the reaction medium selected. Typically, the amount of Lewis acid required is calculated on the basis of one Lewis acid for each ketone unit, plus an amount equimolar to that of Lewis base, or controlling agent, plus up to 20% excess. Larger excesses can be used but offer no significant advantage.

Alternative catalyst systems for electrophilic processes include use of trifluoromethanesulphonic acid, with and without $P_2O_5$, and those using mixtures of $CF_3$—COOH and $CF_3$—$SO_3H$ with and without $P_2O_5$. Terephthalic and isophthalic acids can be used in these super acid mixtures. For example, PEKK can be produced from EKKE plus terephthalic and isophthalic acids in $CF_3$—$SO_3H$, with the $CF_3$—$SO_3H$ is used as the solvent. The $CF_3$—$SO_3H$ reacts with the tere/iso acids to give the mixed carboxylic-sulphonic anhydride $CF_3$—$SO_2$—O—CO-Ph-CO—O—$SO_2$—$CF_3$ which in the presence of an electron rich —H group as in EKKE then eliminate $CF_3$—$SO_3H$ and forms a ketone unit. As an alternative to $CF_3$—$SO_3H$, $CF_3$—COOH with some $CF_3$—$SO_3H$ plus $P_2O_5$ to remove the water produced may be used.

Preferred solvents for the electrophilic polymerisation reaction are halogenated hydrocarbons (e.g. tetrachloroethylene, 1,2,4-trichlorobenzene, o-difluorobenzene, 2-dichloroethane dichlorobenzene, 1,1,2,2,-tetrachloroethane, particularly ortho-dichlorobenzene, dichloromethane etc.). Additionally, or alternatively, non-chlorinated diluents may be used such as cyclohexane, carbon disulphide, nitromethane, nitrobenzene, HF. Dichloromethane (DCM) is particularly preferred for use in the present disclosure.

A non-protic diluent can also be employed, if desired. Advantageously, the diluent should be inert towards Friedel-Crafts reactions. Other diluents include, for example, dichloromethane, carbon disulphide, o-dichlorobenzene (i.e. ortho- or 1,2-dichlorobenzene), 1,2,4-trichlorobenzene, o-difluorobenzene, 1,2-dichloroethane, cyclohexane, 1,1,2,2,-tetrachloroethane and mixtures thereof. Whilst these additional diluents may be used they confer no significant advantage to the process and may result in difficulty in separating the diluents used for further use. A process which is substantially free from co-solvent is therefore a preferred aspect of the present disclosure.

The amount of any diluent used is most preferably in the range of 10 mL to 400 mL, especially 50 mL to 200 mL of diluent to 10 g of polymer. Both higher and lower concentrations (preferably higher) may be used if required.

When electrophilic polymerisation is complete, the polymer contains Lewis acid catalyst complexed to any carbonyl groups (and possibly also to ether groups). The catalyst residue must be removed, i.e. the Lewis acid must be decomplexed from the polymer and removed. Decomplexation can be accomplished by treating the polymerization reaction mixture with a decomplexing base after completion of polymerization. The decomplexing base must be at least as basic towards the Lewis acid as the basic groups on the polymer chain.

The amount of decomplexing base used should be in excess of the total amount of bound (complexed) and unbound Lewis acid present in the reaction mixture and is preferably at least twice the total amount of Lewis acid. Typical decomplexing bases which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulphide, tetramethylene sulphone, benzophenone, tetramethylammonium chloride, isopropanol, acetic acid and the like. Iced water or cooled dilute hydrochloric acid are preferred for use in the present disclosure.

The electrophilic process can be carried out in a manner similar to standard suspension polymerisation reactions. The reactions are generally carried out in a dry and/or inert, preferably dry, especially dry and inert atmosphere, e.g. reaction vessels may be purged with dry air, nitrogen, argon or $CO_2$. Typically, the catalyst (e.g. $AlCl_3$) is added to the cooled solvent (preferably dichloromethane, preferably cooled to well below room temperature, e.g. −20° C.) followed by the controlling agent (preferably benzoic acid) followed by the monomers and (optional) end-capper. Further monomer or monomer mixtures, if required, may then be added in a solution of the same solvent or as solids. The controlling agent may be added earlier or later in the sequence of additions, preferably after the catalyst and before the monomers, provided the temperature of the slurry is kept below −10° C. during the addition, preferably below −20° C. Additional reaction components, e.g. capping agents, additional diluent etc., are typically also added at this stage. If used, the capping agent can be added later, even after the mixture has warmed.

This has the effect of altering the molecular weight distribution which can be advantageous in some instances.

Preferably, the Lewis acid is added to the reaction medium prior to the controlling agent. Especially preferably, the components are added to the reaction medium in the following order:
(i) Lewis acid
(ii) controlling agent
(iii) monomers and (where appropriate) capping agent.

The monomer system suitable for forming aryletherketone units is polymerised before, after, or at the same time as, the comonomer. Moreover, the monomer system suitable for forming aryletherketone units is polymerised in the same vessel or a different vessel to polymerisation of the comonomer For the formation of random copolymers, all types of monomer may be added and/or polymerised together. For the formation of block copolymers, at least one type of monomer is added after at least one other has polymerised, e.g. the monomer system suitable for forming aryletherketone units is polymerised before or after the comonomer. Alternatively, in an embodiment especially suited to the formation of block copolymers, for the formation of block copolymers, different monomers are polymerised in different vessels and then mixed together to form the copolymers of the present disclosure.

The resulting reaction mass is then typically allowed to warm towards room temperature while being stirred vigorously in a suitably baffled reactor. During the polymerisation, any by-products (e.g. condensation products) (e.g. hydrogen chloride) can be trapped and disposed of. After stirring at room temperature for a suitable length of time (in general 4 to 8 hours, preferably 6 hours) work-up/decomplexation can begin by combining the entire reaction mass with decomplexing base (e.g. iced water). Care must be taken to avoid the temperature of the decomplexing mixture rising above room temperature (+25° C.). Prior to decomplexation the reaction mass is typically an orange slurry and after complete decomplexation the mass is usually a snow white/off white slurry. The mass is then typically stirred at or below room temperature to yield the final polymer product.

Solvent removal from this product may be carried out by any conventional method, although typically this will be by distillation. Further purification can be achieved by known methods, e.g. hot filtration of the suspension to yield the polymer product, typically as a snow white/off white residue. Cooling of the combined filtrates, including any acidic washes (e.g. to 5° C.) results in recovery of any benzoic acid used as the controlling agent by crystallisation. Using these methods, up to 95% of the solvent, usually dichloromethane, can be recovered along with up to 90% of the controlling agent (e.g. when the controlling agent is benzoic acid or a benzoic acid derivative).

The polymers produced by way of the methods herein described are considered to form a further aspect of the present disclosure. Thus, in a further aspect, the present disclosure provides a polyaryletherketone copolymer obtainable by any process as herein described.

As noted above, the present disclosure provides, for the first time, a method for the production of polyaryletherketone block copolymers.

Polyaryletherketone block copolymers therefore form a further aspect of the present disclosure.

Furthermore, the present disclosure provides, for the first time, a method for the production of amine-functionalised polyaryletherketone copolymers. Amine-functionalised polyaryletherketone copolymers, wherein said copolymer is neither an amine functionalised PEK-imide copolymer nor an amine functionalised PEK-sulphone copolymer, therefore form a further aspect of the present disclosure.

A further advantage of the present disclosure is that the process can yield polymer particles, e.g. spheres of polyaryletherketone copolymers. The provision of spherical particles directly from the polymer production process is particularly advantageous as it means that costly further processing steps such as grinding and sieving are not necessary. Instead, the process gives spherical particles directly. Moreover, the spherical particles produced according to the present disclosure are more uniform in shape rather than the rough particulates that would be produced by grinding.

Particles of polyaryletherketone copolymers have, until now, been unobtainable, and thus form a further aspect of the present disclosure. Therefore, viewed from a further aspect, the present disclosure provides particles, e.g. spherical or substantially spherical particles of the polyaryletherketone copolymers of the present disclosure.

The particle shape may be irregular, e.g. lozenge shaped, fibrous or rod shaped, preferably with an aspect ratio 1.5 to 10 (where R=a/b, "a" is the largest dimension, and "b" is the smallest dimension), however, in preferred embodiments the polymer particles are primarily, i.e. substantially, spherical, preferably substantially spherical in shape with an aspect ratio (R) of about 1 to 1.5. The polymer morphology is in a semi-crystalline state with the degree of crystallinity greater than 5% to impart good chemical resistance and low moisture pick-up. The particles' physical structure may range from being solid (high density; e.g. density of 1.3 g/cc or greater) to cellular (density of <1 g/cc) structure, or a combination of the two.

By "particle size" is meant particle diameter. The particles according to the present disclosure advantageously have particle sizes (e.g. as measured with a Malvern Mastersizer particle size analyser) of 0.1 to 3000 µm, preferably 1 to 500 µm, especially preferably 1 to 100 µm, particularly 10 to 200 µm, e.g. 50 to 100 µm. Preferably the particles have one dimension that is 75 µm or less, e.g. 10 to 50 µm. Especially preferably, the particles are substantially spherical particles having diameter of less than 75 µm.

Preferably, the particles are substantially spherical in shape with an aspect ratio (R) of about 1 to 1.5.

Typically, at least 25% (by volume) of the particles are less than 100 µm in diameter, preferably at least 50%, e.g. at least 75%. Alternatively, or additionally, at least 20% of the particles are less than 70 µm, preferably at least 40%, e.g. at least 60%.

The particles preferably have a coefficient of variation (CV) of less than 20%, e.g. less than 10%, more preferably less than 5%, still more preferably less than 2%. CV is determined in percentage as, CV=100× standard deviation mean where mean is the mean particle diameter and standard deviation is the standard deviation in particle size. CV is preferably calculated on the main mode, i.e. by fitting a monomodal distribution curve to the detected particle size distribution. Thus some particles below or above mode size may be discounted in the calculation which may for example be based on about 90% of total particle number (of detectable particles that is). Such a determination of CV is performable on a Malvern Mastersizer particle size analyser or a Malvern Mastersizer particle size analyser.

Preferably the polymers or copolymers of the present disclosure have a weight average molecular weight (Mw) of at least 8,000, preferably greater than 9,000, especially greater than 10,000, more specifically, in the range of 8,000-162,000, more preferably, 26,000-162,000. The $M_w$ as disclosed herein can be determined by gel permeation chromatography (GPC).

Preferably the polymers or copolymers of the present disclosure have an inherent viscosity (IV) of at least 0.2 dl/g, e.g. at least 0.28 dl/g, especially at least 0.4 dl/g, particularly preferably at least 0.5 dl/g. Preferred ranges are 0.4-1.7 dl/g, e.g. 0.6-1.5 dl/g. IV as discussed herein can be measured by using a conventional viscometer.

Preferably the polymers or copolymers of the present disclosure have a glass transition temperature ($T_g$) of at least 140° C. as measured by differential scanning calorimetry (DSC), more specifically, in the range of 140-178, especially at least 144° C., particularly preferably at least 148° C., e.g. 158-178° C.

The size of the polymer particles may be controlled by varying the amount of dispersant (i.e. controlling agent) added, amount of polymer per unit volume of solvent, the stirrer speed, the stirrer paddle design, temperature ramp rate, the reactor design and/or the addition of baffles to create turbulence. Other techniques well known in dispersion polymer chemistry may be employed. However, the present inventor has surprisingly found that, not only can the present disclosure provide spherical particles of polyaryletherketone copolymers for the first time, but the method allows the particle size (e.g. distribution and/or mean) to be controlled by varying the amount of controlling agent used.

It has been found that increasing the amount of carboxylic/sulphonic acid based controlling agent relative to the amount of monomers results in the average particle size decreasing. Typical ranges of ratio of moles of controlling agent to moles of acid halide groups are described herein.

The actual amount of controlling agent added depends upon, inter alia, the particular controlling agent used, the nature of the monomers present and the type and amount of Lewis acid employed. As noted above, the ranges given particularly apply to the controlling agents containing one carboxylic acid or sulphonic acid functionality, e.g., those listed as (i) to (iv) above where y or z is equal to 1. For those controlling agents containing more than one acid group per molecule, e.g. where y or z is not 1, the equivalents of controlling agent to acid halide groups in the monomer systems may be adjusted accordingly.

The higher relative amounts of controlling agent can produce particles of a smaller mode particle size than the lower amounts of controlling agent. It has been found that controlling the particle size is particularly suited to PAEK copolymers in which the 1,4-linked units are present in 50% or more by weight.

As well as decreasing the size of the particles produced, increasing the relative amount of controlling agent used can result in extremely small particles being formed. For example, particles of less than one micron, i.e. as small as 0.275 µm have been recorded. If very small particles are desired, the amount of controlling agent (and/or other factors known to influence particle size in polymerisation reactions) can be chosen to optimise the amount of smaller particles and the smallest particles removed from the product mixture, e.g. by using conventional techniques such as sieving, air classification (e.g. air elutration), photoanalysis, optical counting methods, electroresistance counting methods, sedimentation techniques, laser diffraction methods, acoustic spectroscopy, ultrasound attenuation spectroscopy etc.

By varying the amount of controlling agent and separating the particles based on their size, the present disclosure allows PAEK copolymers of graded particle sizes to be produced. This lends the copolymer to a variety of different applications as the size range of the particles can be controlled to suit the end use. For example, very small (e.g. sub-micron particles) could be used for powder impregnation of composites.

Thus the present disclosure provides a method for producing polyaryletherketone copolymers as herein described, having a selected particle size distribution, said method comprising the following steps:

(i) polymerising a monomer system (as herein described) in a reaction medium comprising:
   (a) a Lewis acid;
   (b) a controlling agent comprising an aromatic carboxylic acid, an aromatic sulphonic acid, or a derivative thereof; and (optionally)
   (c) a capping agent comprising a —NR$_2$, —NRH or a protected amine functional group
and
(ii) adjusting the ratio of controlling agent to monomers in the monomer system whereby to control particle size distribution.

Preferably, the particle size is selected by adjusting the ratio of moles of controlling agent to moles of acid halide groups present in the monomer system. Typical ratios of moles of controlling agent to moles of acid halide groups present in the monomer system are as described herein, e.g. from 0.1 to 10, preferably 0.5 to 7, especially 0.7 to 5, particularly preferably 1.5 to 2.

Preferably the copolymers of the present disclosure are amine-functionalised, e.g. amine terminated.

Preferably the copolymers of the present disclosure are in particulate form.

Preferably the copolymers of the present disclosure are block copolymers.

The above-mentioned copolymers, functionalised copolymers, block copolymers and spherical particles of polymer form a further aspect of the present disclosure, as do their uses and articles/composites comprising them.

Compositions comprising the copolymers as herein described, e.g. spherical particles of amine-functionalised copolymers, may comprise the particles (e.g. spherical particles) of PAEK copolymers in a suitable matrix, for example another polymer, such as a thermoplastic or thermoset. The particles can also be utilised as the powders in powder impregnated fibre composites.

The polymer particles may be solid, hollow or porous, e.g. porous with an outer shell. In the case where porous or hollow particles are formed, these may be used to encapsulate or support materials, e.g. active agents in order to impart extra functionality to the polymer. For example, the cellular structure of particles of the present disclosure can allow penetration of liquid thermoset resin to infuse and react to form an interpenetrating network at the article surface The functional groups of the materials of the present disclosure may be used to attach the polymer (e.g. polymer particles) covalently to other materials, e.g. other polymers and can be used, for example, in the production of toughened polymer materials.

The polymers of the present disclosure may be blended with other polymers in order to produce polymer blends suited to a variety of purposes. Moreover, articles comprising the polymers of the present disclosure form a further aspect of the present disclosure.

The copolymers of the present disclosure are particularly useful for use in structural components, composites, additive layer manufacturing, fibres, films, electrical and medical applications.

In a further aspect, the present disclosure provides the above processes wherein the controlling agent is a Lewis base. The term "Lewis base" refers to a substance capable of donating an unshared electron pair to a Lewis acid. Mixtures of two or more Lewis bases can be used if desired. When a Lewis base in employed as controlling agent the polymer formed is typically a gel.

Typical Lewis bases which can be employed include, amides, amines, esters, ethers, ketones, nitriles, nitro compounds, phosphines, phosphine oxides, phosphoramides, sulfides, sulfones, sulfonamides, sulfoxides and halide salts. More specifically, the Lewis base may be selected from acetone, benzophenone, cyclohexanone, methyl acetate, ethylene carbonate, N-methylformamide, acetamide, N,N-dimethylacetamide, N-methylpyrrolidone, urea, tetramethylurea, N-acetylmorpholine, dimethyl sulfoxide, N,N-dimethylformamide, diphenyl sulfone, N,N-dimethylmethanesulfonamide, phosphoryl chloride, phenylphosphonyl chloride, pyridine-N-oxide, triphenylphosphine oxide, trioctylphosphine oxide, nitropropane, nitrobenzene, benzonitrile, n-butyronitrile, methyl ether, tetrahydrofuran, dimethyl sulfide, trimethylamine, N,N,N',N'-tetramethylethylenediamine, N,N-dimethyldodecylamine, imidazole, pyridine, quinoline, isoquinoline, benzimidazole, 2,2'-bipyridine, o-phenanthroline, 4-dimethylaminopyridine etc. In addition to covalent organic compounds, suitable Lewis bases include inorganic salts which can form complexes with Lewis acids, for example, chlorides, such as trimethylammonium chloride, tetramethylammonium chloride, sodium chloride or lithium chloride, perchlorates, trifluoromethanesulfonates etc.

Particularly preferred Lewis bases are dimethylsulphone, N-methylformamide, N,N-dimethylformamide, N,N-dimethylacetamide, 1-methyl-2-pyrrolidone, tetramethylene sulfone (also known as sulfolane), n-butyronitrile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, sodium bromide, potassium chloride, potassium bromide and mixtures thereof.

The present disclosure will now be further described in the following non-limiting examples.

Example 1

Amine-Terminated Random Imide-Sulphone-Ketone Copolymer (Dispersion)

To a 2000 ml reaction flask equipped with a mechanical stirrer, having been purged with dry nitrogen, was added 800 ml of dry dichloromethane. Having cooled the dichloromethane to −20° C. 476 g (3.57 mols) of anhydrous aluminium chloride was added. Also at −20° C. was added 175.75 g (1.44 mols) of benzoic acid taking care not to let the temperature of the slurry to rise above −10 C. This was followed by 100.31 g (0.1556 mol) of pure bis-imide monomer (EIEIE)

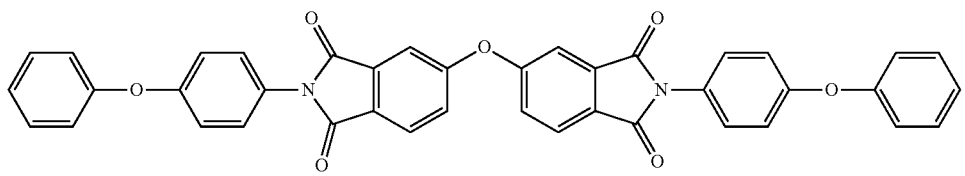

Bis imide (EIEIE) monomer along with 200 ml of dichloromethane to wash in any powder residues; the temperature was maintained below −10° C. This was followed by 69.69 g (0.1902 mol) of 4,4'-diphenoxydiphenylsulphone ("ESE") also at −10° C. and also washed into the reactor with 200 ml of dichloromethane. This was followed by 73.13 g (0.3602 mols) of terephthaloyl chloride ("KK") was added to the slurry along with a further 100 ml of dichloromethane to was in any powder residues. Finally the protected amine end-capper $CF_3$—CO—NH-Ph-O-Ph ($CF_3$-EC) 8.0928 g (0.0288 mol) was added and washed into the reactor with 25 ml of dichloromethane.

Whilst stirring at 450 rpm the reaction mass was warmed to 0° C. and maintained for 30 mins. The mass was then warmed to +20° C. and maintained for 6 hours. During this period, the colour of the reaction mass was dark orange. During the polymerisation, hydrogen chloride was evolved which was trapped and disposed of safely.

After stirring at room temperature for 6 hours the reaction mass was poured into 5 liters of iced water (care must be taken to avoid the temperature of the decomplexing mixture rising above room temperature). The aqueous mass was then stirred at room temperature for 4 hours or until all of the orange colouration had disappeared leaving a pale cream mass.

Having transferred the mass to a suitable vessel, the vessel was heated and the dichloromethane distilled off. The yield of the recovered dichloromethane was 92% by weight. Having removed all of the dichloromethane, the mass was brought to reflux and refluxed for 1 hour whereupon the suspension was filtered whilst hot. While the filtrate was left to cool the white polymer solid was added to a further 3 liters of deionised water containing 300 ml of concentrated hydrochloric acid and brought to reflux, the reflux maintained for 1 hour. This was repeated a further two times, without the hydrochloric acid, and in each case the filtrate was added to the initial filtrate and allowed to cool. The polymer powder was refluxed in deionised water containing 100 ml of 0.88 ammonia. Finally the polymer powder was refluxed in deionised water with no additives. The polymer powder was then dried overnight at 80° C. in air and then at 200° C. overnight under vacuum. On cooling, benzoic acid crystallised from the combined filtrates. The yield of benzoic acid was enhanced by chilling the filtrates to 5° C. The yield of the recovered benzoic acid was 77% by weight.

The Inherent Viscosity (IV) of the polymer was determined by dissolving approximately 25 mg of the polymer in 25 ml of concentrated sulphuric acid at 25° C. The IV of this sample was 0.92 dig. The structure of the polymer was confirmed by $^{13}C$ NMR. The presence of amine terminations was confirmed using infra-red spectroscopy.

The $T_g$ of the polymer was 198° C., no $T_m$ was observed.

Example 2

Amine-Terminated Random Imide-Sulphone-Ketone Copolymer (Gel)

Example 1 was repeated substituting the benzoic acid for dimethyl sulphone where the quantity of dimethyl sulphone was 50.85 g (0.5404 mol) and the amount of aluminium chloride was 344 g (2.58 mol). The polymer was isolated as a gel and decomplexed using a Waring blender. None of the dimethyl sulphone was recovered and only 20% of the dichloromethane.

The IV of the polymer was 0.97 dl/g and the $T_g$ 197° C. The polymer was characterised as in example 1.

Example 3

Amine-Terminated Random PEKEKK-PESEKK Copolymer (Gel)

The method of example 1 was repeated using the following reagents:

4,4'-diphenoxybenzophenone (EKE): 96.05 g (0.2621 mol)

4,4'-diphenoxydiphenylsulphone (ESE): 128.81 g (0.3204 mol)

1:1 mixture of terephthaloyl and isophthaloyl chlorides: 120.67 g (0.5944 mol)

Dimethyl sulphone: 82.2 g (0.8734 mol)

Aluminium chloride: 423.14 g (3.17 mol)

$CF_3$—CO—NH-Ph-O-Ph ($CF_3$-EC): 6.6878 g (0.0238 mol)

The IV of the polymer was 1.47 dL/g. The $T_g$ of the polymer was 173° C.

Example 4

Amine-Terminated Random PEKEKK-PEIEIEKK Copolymer (Gel)

The method of example 1 was repeated using the following reagents:

4,4'diphenoxybenzophenone (EKE): 94.54 g (0.258 mol)

Bis imide monomer EIEIE: 83.16 g (0.129 mol)

Terephthaloyl chloride: 85.25 g (0.4199 mol)

Dimethyl Sulphone: 79.06 g (0.84 mol)

Aluminium chloride: 394 g (2.95 mol)

CF3-CO—NH-Ph-O-Ph ($CF_3$-EC): 18.4898 g (0.0658 mol)

The IV of the polymer was 0.62 dL/g. The $T_g$ was 180° C. and the $T_m$ 344° C.

Example 5

Amine-Terminated Random PEKK-PEIEIEKK Copolymer (Gel)

Example 4 was repeated replacing the 4,4'-diphenoxybenzophenone with 1,4-bis(4-phenoxybenzoyl)benzene (EKKE): 121.39 g (0.258 mol)

The amount of aluminium chloride used was 434 g (3.25 mol)

The IV of the polymer was 0.64 dL/g. The $T_g$ was 182° C. and the $T_m$ 346° C.

Example 6

Amine-Terminated Random PEKEKK-PEAm-1,3-AmEKK Copolymer (Gel)

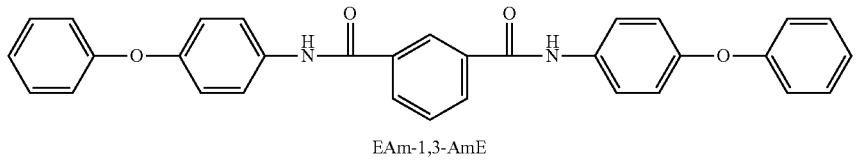 [SMILES: O=C(Nc1ccc(Oc2ccccc2)cc1)c1cccc(C(=O)Nc2ccc(Oc3ccccc3)cc2)c1]

EAm-1,3-AmE

The method used is example 1 was repeated using the following reagents.
4,4'-diphenoxybenzophenone (EKE): 54.58 g (0.1489 mol)
EAm-1,3-AmE: 70.96 g (0.1489 mol)
Terephthaloyl chloride: 63.00 g (0.3103 mol)
Dimethyl sulphone: 58.35 g (0.62 mol)
Aluminium chloride: 268.99 g (2.02 mol)
$CF_3$—CO—NH-Ph-O-Ph ($CF_3$-EC): 7.025 g (0.025 mol)
The IV of the resultant polymer was 0.97 dL/g
The $T_g$ of the polymer was 200° C., the $T_m$ was 342° C.

Example 7

Block PEKEKK-PESEKK Copolymer (Dispersion)

Using a 1000 ml reactor set up as in example 1 the following reagents were used.
4,4'diphenoxybenzophenone (EKE): 25 g (0.0682 mols)
4,4'-diphenoxydiphenylsulphone (ESE): 27.46 g (0.0682 mols)
Terephthaloyl chloride: 26.86 g (0.1323 mols)
Benzoic acid: 64.63 g (0.5292 mols)
Aluminium chloride: 148.97 g (1.12 mols)
Benzoyl chloride: 1.1526 g (8.2×10$^{-3}$ mols)
Dichloromethane: 600 ml To the cooled dichloromethane (300 ml) was added all of the aluminium chloride. This was followed by all of the benzoic acid ensuring the temperature of the slurry remained below −10° C. Also at −10° C. was added all of the 4,4'diphenoxybenzophenone and powder residues were washed into the reaction vessel with 50 ml of dichloromethane. To the yellow suspension was then added 10.389 g (0.0512 mols) of the terephthaloyl chloride. This should give a PEKEKK repeat unit of ~4. While stirring at 450 rpm the reaction mass was warmed to +10° C. and maintained for 1.5 hours. After this time all of the 4,4'-diphenoxydiphenylsulphone and the remaining terephthaloyl chloride was added and any powder residues washed into the reaction vessel with the remaining dichloromethane. The reaction mass was then heated to +20° C. and maintained for 4 hours. The work-up used was as in example 1. The IV of the polymer was 0.91 dL/g. The $T_g$ of the polymer was 185° C. and the $T_m$ 362° C. By comparison the $T_g$ of the same fully random copolymer was 176° C. and the polymer was essentially amorphous.

Example 8

Amine-Terminated Block PEKEKK-PESEKK Copolymer (Dispersion)

Example 7 was repeated using the following reagents. This gives an —NH$_2$ terminated polymer.
4,4'diphenoxybenzophenone (EKE): 25 g (0.0682 mols)
4,4'-diphenoxydiphenylsulphone (ESE): 27.46 g (0.0682 mols)
Terephthaloyl chloride: 28.54 g (0.1406 mols)
Benzoic acid: 68.68 g (0.5624 mols)
Aluminium chloride: 148.97 g (1.12 mols)
$CF_3$—CO—NH-Ph-O-Ph ($CF_3$-EC): 2.3604 g (8.4×10$^{-3}$ mols)
Dichloromethane: 600 ml

Example 9

Block PEKEKK-PEIEIEKK Copolymer (Dispersion)

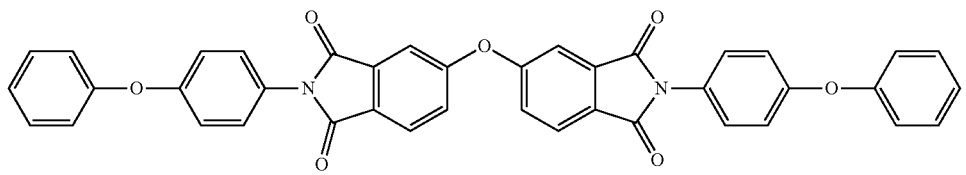

Bis-imide (EIEIE) monomer

Using a 1000 ml reactor set up as in example 1 the flowing reagents were used.
4,4'-diphenoxybenzophenone (EKE): 20 g (0.0546 mols)
Bis-imide EIEIE: 35.186 g (0.0546 mols)
Terephthaloyl chloride: 21.06 g (0.1037 mols)
Benzoic acid: 50.66 g (0.4148 mols)
Aluminium chloride: 143.24 g (1.07 mols)
Benzoyl chloride: 1.5463 g (0.011 mols)
Dichloromethane: 600 ml As in example 7 where in the first phase all of the 4,4'diphenoxybenzophenone was reacted with 8.3137 g (0.04095 mols) of terephthaloyl chloride giving a PEKEKK block of ~4 repeat units.

The IV of the resultant polymer was 0.84 dL/g. The $T_g$ of the polymer was 186° C. the $T_m$ was 360° C. By contrast the random copolymer is essentially amorphous.

Example 10

Amine-Terminated Block PEKEKK-PEIEIEKK Copolymer (Dispersion)

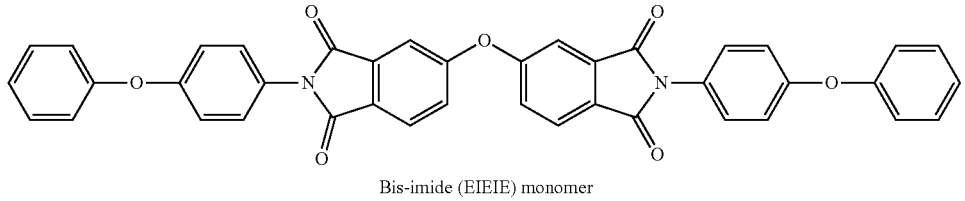 [SMILES: O=C1c2ccc(Oc3ccc4c(c3)C(=O)N(c3ccc(Oc5ccccc5)cc3)C4=O)cc2C(=O)N1c1ccc(Oc2ccccc2)cc1]

Bis-imide (EIEIE) monomer

As in example 9 using the following reagents:
4,4'-diphenoxybenzophenone (EKE): 20 g (0.0546 mols)
Bis-imide EIEIE: 35.186 g (0.0546 mols)
Terephthaloyl chloride: 23.35 g (0.1150 mols)
Benzoic acid: 56.18 g (0.46 mols)
Aluminium chloride: 154.09 g (1.156 mols)
CF3-CO—NH-Ph-O-Ph (CF$_3$-EC): 3.259 g (0.0116 mols)
Dichloromethane: 600 ml

What is claimed is:

1. A method of preparing particles of an amine-functionalised polyaryletherketone copolymer having an viscosity of at least 0.4 dl/g, said method comprising:
   polymerizing, via an electrophilic process, (i) a monomer system suitable for forming aryletherketone units and comprising an acid halide and (ii) a comonomer system suitable for forming non-aryletherketone units which comprises moieties other than aryl, ether and ketone unit and an acid halide in a reaction medium comprising:
   (a) a Lewis acid;
   (b) a controlling agent comprising an aromatic carboxylic acid, an aromatic sulphonic acid, or a derivative thereof; and
   (c) a capping agent comprising —NHL, —NRL or -NL$_2$, wherein L is a leaving group selected from acetyl, haloacetyl, halosulphonyl and sulphonyl and R is an aliphatic or aromatic group,
   wherein the polymerization takes place as a single step reaction in presence of the Lewis acid, the controlling agent and the capping agent in the reaction medium at a temperature from −50° C. to 150° C.,
   wherein the comonomer does not comprise an imide group and/or a sulphone group.

2. The method of claim 1, wherein said comonomer comprises an ester, imide, sulphone and/or amide group.

3. The method of claim 1, wherein the polyaryletherketone copolymer is a block copolymer, and said monomer system suitable for forming the aryletherketone units is polymerized separately to the comonomer.

4. The method of claim 1, wherein said comonomer comprises an ester, sulphone and/or amide group.

5. The method of claim 1, wherein said aryletherketone unit does not comprise -Ph-O-Ph-C(=O)-Ph-O-Ph-C(=O)-Ph-C(=O)—.

6. The method of claim 1, wherein said monomer system suitable for forming the aryletherketone units is polymerized separately to, or simultaneously with, the comonomer.

7. The method of claim 1, wherein said aryletherketone units are independently selected from the group consisting of:
   —Ar—O—Ar—C(=O)—,
   —Ar—O—Ar—C(=O)—Ar—C(=O)—,
   —Ar—O—Ar—O—Ar—C(=O)—,
   —Ar—O—Ar—O—Ar—C(=O)—Ar—C(=O)—, and
   —Ar—O—Ar—C(=O)—Ar—O—Ar—C(=O)—Ar—C(=O)—,
   wherein each Ar is independently an aromatic moiety.

8. The method of claim 7, wherein each Ar is independently selected from the group consisting of substituted or unsubstituted mononuclear aromatic moieties and substituted or unsubstituted polynuclear aromatic moieties.

9. The method of claim 1, wherein said controlling agent is one or more of:
   (i) Ar'(COOX)$_y$;
   (ii) Ar'(SO$_3$X)$_y$;
   (iii) (Ar'COO$^-$)$_z$M$^{z+}$; or
   (iv) (Ar'SO$_3^-$)$_z$M$^{z+}$
   wherein Ar' is an aromatic group compatible with components remained in the reaction medium;
   each X independently is a hydrogen atom or an organic group (R);
   each y independently is 1, 2 or 3;
   each M independently is a metal; and
   each z independently is an integer equal to charge on the metal ion (M').

10. The method of claim 1, wherein said capping agent is represented by formula (Z)$_a$—Ar—(X)$_b$ wherein:
    each X is independently selected from the group consisting of —O—Ar, —C(=O)Cl, —C(=O)—Ar—O—Ar and —O—Ar—[—C(=O)—Ar—O—Ar—]$_c$—H wherein each Ar is independently an aromatic moiety;
    c is an integer,
    Z is a protected amine group,
    a is 1 to 5, and
    b is 1 to 5.

11. The method of claim 10, wherein each Z is independently selected from the group consisting of —NHL, —NRL and —NL$_2$, and each L is a leaving group independently selected from the group consisting of acetyl, haloacetyl, sulphonyl, halosulphonyl, c is 1 to 10, each R is independently an aliphatic or aromatic group, a is 1, 2 or 3, and b is 1, 2 or 3.

12. The method of claim 1, wherein said reaction medium comprises two or more types of comonomers.

13. The method of claim 1, wherein the polyaryletherketone copolymer is an amine-functionalised polyaryletherketone copolymer, and said amine-functionalised polyaryletherketone copolymer is neither an amine-functionalised polyaryletherketone-imide copolymer nor an amine-functionalised polyaryletherketone-sulphone copolymer.

14. The method of claim 1, wherein said —NL₂ is:
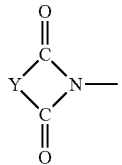
wherein Y is an aryl group, —(CH₂)ₙ— or —(CF₂)ₙ—, wherein n is an integer from 2 to 6.
15. The method of claim 1, wherein said L is —SO₂—CH₃ or —SO₂—CF₃.
* * * * *